United States Patent
Antel, Jr. et al.

(10) Patent No.: US 7,633,066 B2
(45) Date of Patent: Dec. 15, 2009

(54) MULTIWAVELENGTH PYROMETRY SYSTEMS

(75) Inventors: William Joseph Antel, Jr., Freising (DE); Nirm Velumylum Nirmalan, Niskayuna, NY (US); Jason Randolph Allen, Niskayuna, NY (US); Jeffrey Lawrence Williams, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 450 days.

(21) Appl. No.: 11/438,604

(22) Filed: May 22, 2006

(65) Prior Publication Data

US 2007/0290131 A1    Dec. 20, 2007

(51) Int. Cl.
*G01J 5/08*    (2006.01)
(52) U.S. Cl. .................... 250/339.02; 374/124; 374/137
(58) Field of Classification Search .............. 250/338.1, 250/339.02, 339.04, 339.1, 347, 353; 374/120, 374/121, 124, 126, 130, 137, 159, E13.01
See application file for complete search history.

(56) References Cited

U.S. PATENT DOCUMENTS

| | | | |
|---|---|---|---|
| 3,537,795 A * | 11/1970 | Clerc | .......................... 356/51 |
| 3,696,678 A * | 10/1972 | Mossey | ...................... 374/104 |
| 4,118,985 A | 10/1978 | Compton | |
| 4,142,417 A | 3/1979 | Cashdollar et al. | |
| 4,204,744 A | 5/1980 | Wittmann | |
| 4,239,330 A | 12/1980 | Ashkin et al. | |
| 4,326,798 A | 4/1982 | Kahn | |
| 4,378,144 A | 3/1983 | Duck et al. | |
| 4,441,785 A | 4/1984 | Petrozello | |
| 4,568,183 A | 2/1986 | Douglas | |
| 4,579,461 A | 4/1986 | Rudolph | |
| 4,582,426 A | 4/1986 | Douglas | |
| 4,648,711 A | 3/1987 | Zachary | |
| 4,657,386 A | 4/1987 | Suarez-Gonzalez et al. | |
| 4,666,297 A * | 5/1987 | Suarez-Gonzalez | .......... 356/45 |
| 4,681,434 A | 7/1987 | Kepple | |

(Continued)

FOREIGN PATENT DOCUMENTS

EP    0379192 A2    7/1990

(Continued)

OTHER PUBLICATIONS

P. Zombo and Dr. Hans-Gerd Brummel, Siemens Power Generation, "On Line Monitor—High Speed Infrared Images of Operating Turbine Blades", Propulsion—Safety and Affordable Readiness (P-SAR) Program Review, Mar. 28-30, 2006, Jacksonville, Florida, Slide 14.

(Continued)

*Primary Examiner*—David P Porta
*Assistant Examiner*—David S Baker
(74) *Attorney, Agent, or Firm*—Penny A. Clarke (57) ABSTRACT

A thermal measurement system includes a number of detectors configured to receive radiation within respective wavelength ranges. The system also includes a mirror configured to selectively direct the radiation from an object to each of the detectors. The system further includes an actuator mechanically coupled to the mirror and configured to rotate the mirror through a number of angles. The system also includes an optical and probe subsystem disposed between the object and the mirror to focus the radiation on to the mirror.

15 Claims, 5 Drawing Sheets

U.S. PATENT DOCUMENTS

| | | | |
|---|---|---|---|
| 4,708,474 A | | 11/1987 | Suarez-Gonzalez |
| 4,753,501 A | | 6/1988 | Battle |
| 4,779,977 A | | 10/1988 | Rowland et al. |
| 4,790,669 A | | 12/1988 | Christensen |
| 4,799,787 A | | 1/1989 | Mason |
| 4,814,870 A | * | 3/1989 | Crall .......................... 348/168 |
| 4,896,935 A | | 1/1990 | Lee |
| 4,907,895 A | | 3/1990 | Everest |
| 4,942,294 A | | 7/1990 | Witte |
| 4,970,670 A | * | 11/1990 | Twerdochlib ................. 702/99 |
| 5,123,751 A | | 6/1992 | Baker |
| 5,125,739 A | | 6/1992 | Suarez-Gonzalez et al. |
| 5,132,922 A | | 7/1992 | Khan et al. |
| 5,149,959 A | * | 9/1992 | Collins et al. ............... 250/226 |
| 5,211,478 A | | 5/1993 | Horsley |
| 5,265,036 A | | 11/1993 | Suarez-Gonzalez et al. |
| 5,292,196 A | | 3/1994 | Iida et al. |
| 5,348,396 A | | 9/1994 | O'Rourke et al. |
| 5,408,550 A | | 4/1995 | Lefevre et al. |
| 5,421,652 A | | 6/1995 | Kast et al. |
| 5,507,576 A | | 4/1996 | Fally |
| 5,664,034 A | | 9/1997 | Mock |
| 5,755,510 A | * | 5/1998 | Hernandez et al. .......... 374/121 |
| 6,031,947 A | | 2/2000 | Laor |
| 6,109,783 A | | 8/2000 | Dobler et al. |
| 6,121,616 A | | 9/2000 | Trigg |
| 6,513,971 B2 | | 2/2003 | Tubbs |
| 6,539,132 B2 | | 3/2003 | Ivtsenkov et al. |
| 6,698,920 B1 | | 3/2004 | Maylotte et al. |
| 6,726,761 B2 | | 4/2004 | Hodgkinson et al. |
| 6,786,635 B2 | | 9/2004 | Choi |
| 6,796,709 B2 | | 9/2004 | Choi |
| 6,992,315 B2 | * | 1/2006 | Twerdochlib .......... 250/559.08 |
| 7,003,425 B2 | | 2/2006 | Bird et al. |
| 7,064,811 B2 | | 6/2006 | Twerdochlib |
| 2003/0127602 A1 | * | 7/2003 | Harrold et al. ............... 250/372 |
| 2004/0179575 A1 | * | 9/2004 | Markham .................... 374/121 |
| 2006/0088793 A1 | | 4/2006 | Brummel et al. |
| 2006/0180760 A1 | * | 8/2006 | Lane et al. ............. 250/339.05 |
| 2008/0095212 A1 | * | 4/2008 | Jonnalagadda et al. ...... 374/124 |

FOREIGN PATENT DOCUMENTS

| | | |
|---|---|---|
| JP | 3077030 A | 2/1991 |
| WO | WO 2005050163 A2 * | 6/2005 |

OTHER PUBLICATIONS

R. S. Bunker et al., "System and Method for Thermal Inspection of Parts," U.S. Appl. No. 11/775,502, filed Jul. 10, 2007.

J. R. Allen et al., "Online System and Methods for Thermal Inspection of Parts," U.S. Appl. No. 11/842,219, filed Aug. 21, 2007.

J. R. Allen et al., "System and Method for Thermal Inspection of Objects," U.S. Appl. No. 12/120,617, filed May 14, 2008.

* cited by examiner

MULTIWAVELENGTH PYROMETRY SYSTEMS

STATEMENT REGARDING FEDERALLY SPONSORED RESEARCH & DEVELOPMENT

This invention was made with Government support under contract number HR0011-04-C-0002 awarded by DARPA. The Government has certain rights in the invention.

BACKGROUND

The invention relates generally to temperature measurement systems, and more particularly to multiwavelength pyrometry systems.

It is well known that the efficiency of gas turbine engines can be increased by raising the turbine operating temperature. As operating temperatures are increased, the thermal limits of certain engine components, such as the turbine blades or vanes, may be exceeded, resulting in reduced service life or even material failure. In addition, the increased thermal expansion and contraction of these components adversely affects clearances and their interfitting relationship with other components. Thus, it is desirable to monitor the temperature of hot gas path components during operation to assure that they do not exceed their maximum rated temperature for an appreciable period of time. Additionally, the desire to measure temperature extends to all heat engine applications where excessive working fluid temperatures can damage parts.

One approach to monitoring hot component temperatures is to measure the temperature of the gas leaving the engine and to use this as an indication of the part temperature. However, indirect temperature measurement techniques are relatively inaccurate, and approaches for measuring part temperatures directly have been proposed. One such technique, pyrometry, offers a number of advantages, as described below.

Pyrometers, also referred to as infrared thermometers, provide non-contact temperature measurements of an object and have been used to estimate temperatures of objects in a variety of industrial, scientific and commercial processes. One of the techniques in pyrometry that has been used is multi-wavelength pyrometry. In this technique, absolute temperature of an object is determined by sampling and combining radiation emitted by the object at multiple wavelengths.

However, for existing multi-wavelength pyrometer systems, incoming radiation from an object is split by a fixed beam splitter or a fixed semi-transparent mirror for transmission onto multiple detectors. Splitting the radiation results in less radiation being collected by each detector. As a consequence, longer acquisition times are necessary to obtain the desired accuracies. Generally, it has been seen that the data acquisition times for such systems are too slow to measure temperature profiles of rapidly moving parts and/or those undergoing rapid thermal change.

Therefore, there is a need for an improved multiwavelength pyrometry system to address the aforementioned issues.

BRIEF DESCRIPTION

In accordance with one embodiment, a thermal measurement system is provided. The system includes a plurality of detectors configured to receive radiation within a respective plurality of wavelength ranges. The system also includes a mirror configured to selectively direct the radiation from an object to each of the detectors. The system further includes an actuator mechanically coupled to the mirror and configured to rotate the mirror through a plurality of angles. The system further includes an optical and probe subsystem disposed between the object and the mirror to focus the radiation on to the mirror.

In accordance with another embodiment of the invention, another thermal measurement system is provided. The thermal measurement system includes a rotor configured to rotate about an axis. The system also includes a plurality of detectors circumferentially arranged on the rotor and configured to receive radiation within a plurality of wavelength ranges. The system further includes a motor mechanically coupled to the rotor and configured to rotate the rotor about the axis. The system further includes an optical and probe subsystem disposed between the object and the rotor and configured to focus radiation from the object onto each of the detectors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include an improved thermal measurement system (or an improved multi-wavelength pyrometry system) that provides a non-contact means for measuring high temperatures of an object by sampling multiple wavelengths of emitted radiation from the object. As used herein, the term "high temperatures" refers to absolute temperatures above about 1000° F. of the object. The sampled radiation is then processed to output temperature and emissivity of the radiation. "Emissivity" is a surface characteristic of the object and is a function of temperature and wavelength. Emissivity is defined as the ratio of radiation emitted by a surface of the object to the radiation emitted by a black body at the same temperature.

Figure 1:
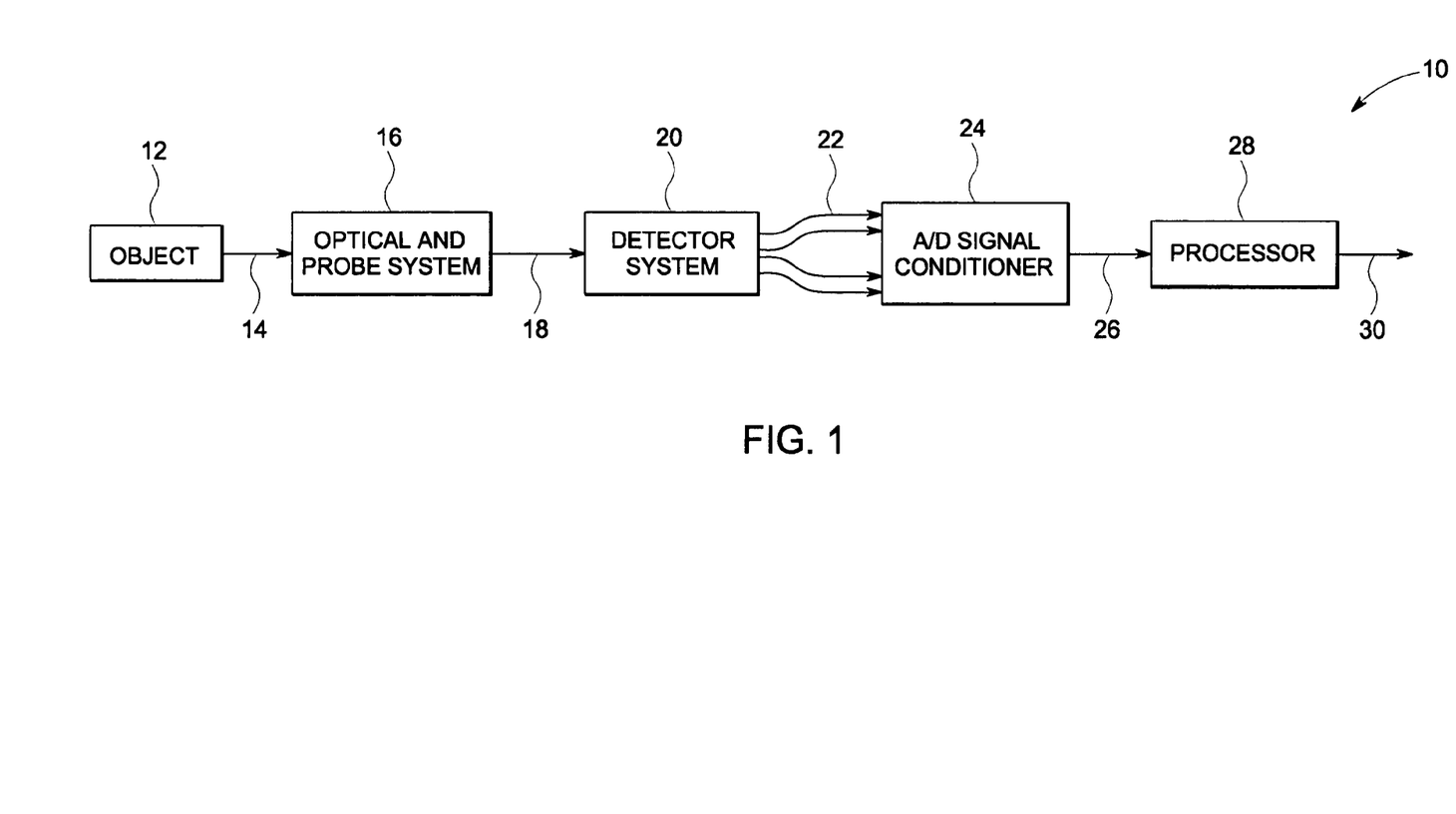
FIG. 1 is a block diagram representation of a multiwavelength pyrometer system in accordance with embodiments of the invention.

Turning now to the drawings, FIG. 1 is a block diagram representation of a multiwavelength pyrometer system 10 (thermal measurement system 10) in accordance with embodiments of the invention. The system 10 includes an object 12 emitting radiation 14. The radiation 14 passes through an optical and probe system 16 so as to direct radiation 18 onto a detector system 20. The detector system 20, which will be described in detail below with reference to FIGS. 2 and 3, samples multiple wavelengths of the radiation 18 and emits a calibrated analog signal 22. The calibrated analog signal 22 further passes through an analog to digital (A/D) conditioner 24 that outputs a digital signal 26. The A/D conditioner 24 is further configured to improve the signal quality. The digital signal 26 is finally input to a processor 28 that processes the signal 26 and outputs emissivity spectrum and temperature 30 of the object 12. For example, the processor 28 is configured to process the signal using an algorithm to deduce the temperature of the emitting object without prior knowledge of other radiative physics (i.e., emissivity and/or reflected radiant energy).

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

Figure 2:
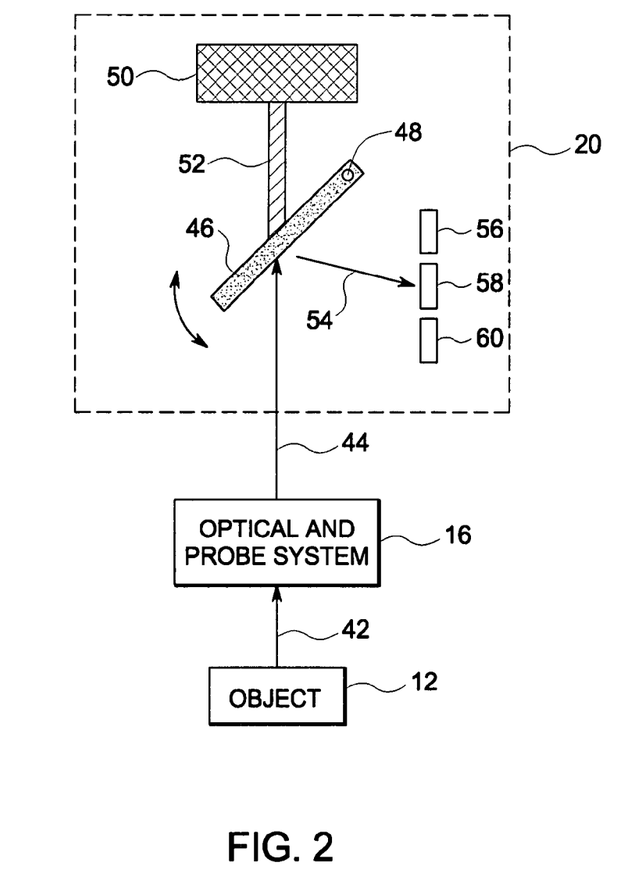
FIG. 2 is a schematic representation of an exemplary configuration of a detection system in the multiwavelength pyrometer system of FIG. 1.

FIG. 2 illustrates an exemplary configuration of the detector system 20, as referenced in FIG. 1. The object 12 emits radiation 42 that passes through the optical and probe system 16. Although many of the examples discussed below involve rotating objects 12, the detector system is equally applicable to both stationary and rotating objects. In an example, the wavelength of the radiation 42 is above 0.6 micrometers. In this wavelength range, there exist ranges with low radiation absorption by water and carbon dioxide. Additionally, in this range there exist many commercially available detectors. According to a particular embodiment, at least 3 wavelengths in this range are selected, and one detector is provided for each of the respective wavelengths. The wavelength selection may be fine-tuned based upon the application, for example based upon the operating temperatures of the object under test. Radiation 44 from the optical and probe system 16 then passes through the detector system 20. The optical and probe system 16 focuses the radiation onto the detection system 20. In an example, the optical and probe system includes a lens and fiber optic cable. Fiber optics may be employed in applications with hot environments. In another example, the optical and probe system includes an assembly of lenses and mirrors. In the illustrated embodiment, the radiation 44 is incident on a mirror 46 that can rotate via a pivot 48. For particular embodiments, the mirror 46 is coated. In one example, a first surface coating of the mirror is selected such that the desired radiation is maximally reflected. Mirror and optics materials may be selected to maximize the radiance signal to the detectors and withstand the appropriate environmental temperatures. The mirror 46 is mechanically coupled to an actuator 52 through a connecting arm 50. This facilitates rotation of the mirror 46 through multiple angles directing the radiance to the detectors. According to a particular embodiment, the actuator 52 comprises a piezoelectric actuator. The incident radiation 44 is reflected by the mirror 46 on to one of a series of detectors 56, 58 and 60. The use of three detectors is purely illustrative, and for particular embodiments there are 4-6 detectors. Each of the detectors 56, 58 and 60 may include one or more filters that allow selective filtering of incoming radiation 54. Radiation transmitted from each of the detectors 56, 58 and 60 is further processed to output a temperature profile and an emissivity spectrum of the object 12.

According to a particular embodiment, the angle of mirror 46 is not adjusted continuously but rather is indexed to one of several angles that correspond to reflection angles into the detectors 56, 58 and 60. More particularly, the distances between the object 12, the mirror 46 and the detectors 56, 58 and 60 are selected such that a small change in the angle of the mirror 46 results in a switch between the detectors 56, 58 and 60. Beneficially, small angle changes facilitate rapid switching between the detectors, which is desirable for the acquisition of thermal data for rapidly moving objects, such as turbine blades. In addition, the scale of the mirror may vary based upon application. For particular applications, the mirror length may be micro-scaled with the mirror configured to direct optical signals into an optical computer and/or to multiplex a signal between multiple fiber optics.

Figure 3:
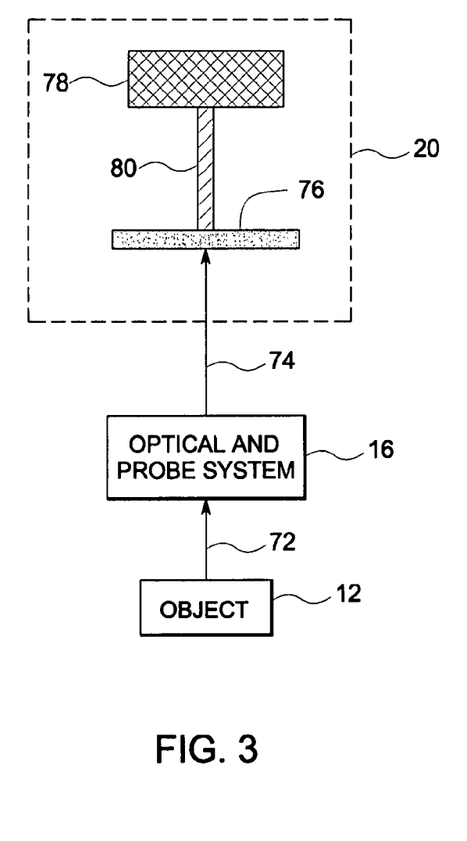
FIG. 3 is a side view representation of another exemplary configuration of a detection system in the multiwavelength pyrometer system of FIG. 1.

FIG. 3 illustrates a side view of another exemplary configuration 70 of the detection system 20 referenced in FIG. 1. An object 12 emits radiation 72 that passes through an optical and probe system 16. The optical and probe system 16 focuses the radiation 74 onto the detection system 20. In the illustrated configuration, the detection system 20 includes a rotor 76 that is described more in detail below with reference to FIG. 4. The rotor 76 is coupled to a motor 78 that is configured to rotate the rotor 76 about an axis via a supporting arm 80. According to a particular embodiment, the motor 78 comprises a stepper motor attached to the rotor 76 via shaft 80.

Figure 4:
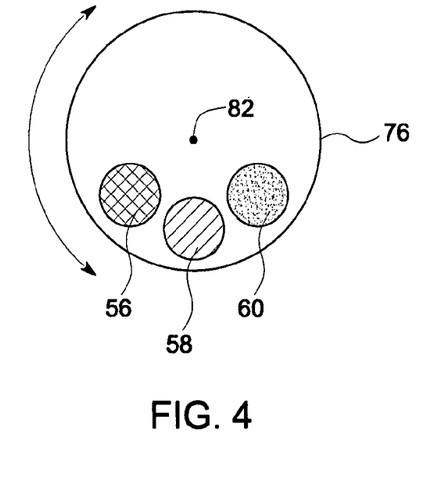
FIG. 4 is a top view representation of the detection system of FIG. 3.

FIG. 4 is top view illustration of the rotor 76 in FIG. 3. The rotor 76 rotates via a pivot 82 about an axis and includes detectors 56, 58 and 60. The radiation 74 in FIG. 3 is incident onto each of the detectors 56, 58 and 60 via rotation of the rotor 76. The use of three detectors is purely illustrative, and according to particular embodiments there are 4-6 detectors. Each of the detectors 56, 58 and 60 may include multiple filters that allow selective filtering of incoming radiation 74. Radiation transmitted from each of the detectors 56, 58 and 60 is further processed to output a temperature profile and an emissivity spectrum of the object 12.

According to particular embodiments, at least 3 detectors will be employed, and the radiation 42 and 72 emitted by the object 12 includes infrared radiation and may be visible. For example, the object may be a hot gas path component, such as a turbine blade, with an operating temperature in a range of 1000-2400 degrees Fahrenheit, such that the radiation emitted from the object includes light with wavelengths above 0.6 microns. All objects above absolute zero emit radiation at all wavelengths. Spectral properties and temperature of an object will dictate the spectral radiance emitted. In certain examples, 4-6 detectors are employed. Example detectors for radiation in this wavelength range include but are not limited to indium-gallium-arsenide based detectors, silicon based detectors, extended indium-gallium-arsenide based detectors and lead-antimony based detectors.

According to particular embodiments, the object 12 is a rotating object such as a gas turbine blade. Turbine blades rotate rapidly, on the order of 3000 revolutions per minute (rpm) for power generation applications and up to 18000 rpm for aviation applications, necessitating the rapid acquisition of thermal data. Advantageously, the exemplary detector system configurations described above with reference to FIGS. 2 and 3 may be used to measure the temperature profile of a rotating object at steady state. Generalizing for a scenario with detection system 20 with n detectors, the time elapsed between acquiring data for a first one of the detectors D1 and a nth detector Dn is equal to about 2n−1 revolutions of the rotating object. Specifically, data is collected for one revolution using one detector. During the subsequent rotation, the mirror is rotated to the next detector. Radiation is then collected for one full rotation. Similarly, the mirror is rotated during the subsequent rotation, and the process is repeated. Hence, in an example, for a detection system 20 with 5 detectors, the time elapsed between acquiring data for a first detector and a fifth detector is equal to 9 revolutions of the rotating object. In the case of a rotating gas turbine blade, where typical turbine rotation speeds are about 15000 revolutions per minute (rpm), a time period of 9 revolutions is short enough to assume data as being obtained in parallel. Further, in a typical gas turbine blade application involving 80 blades rotating at 15000 rpm, each of the detectors 56, 58 and 60 is configured to detect multiple points on a single blade in each revolution. For example, at least 50 points may be sampled for each blade per revolution. This sampling of multiple points facilitates the determination of a thermal profile for the blade. In particular, in the case of a rotating object such as a gas turbine blade system, points detected on each blade in a revolution trace out a line across a blade chord resulting in a one dimensional temperature profile as the blades rotate. In addition, the detection system 20 may be configured to detect a two dimensional temperature map of the blades as is described below with reference to FIGS. 5 and 6.

Figure 5:
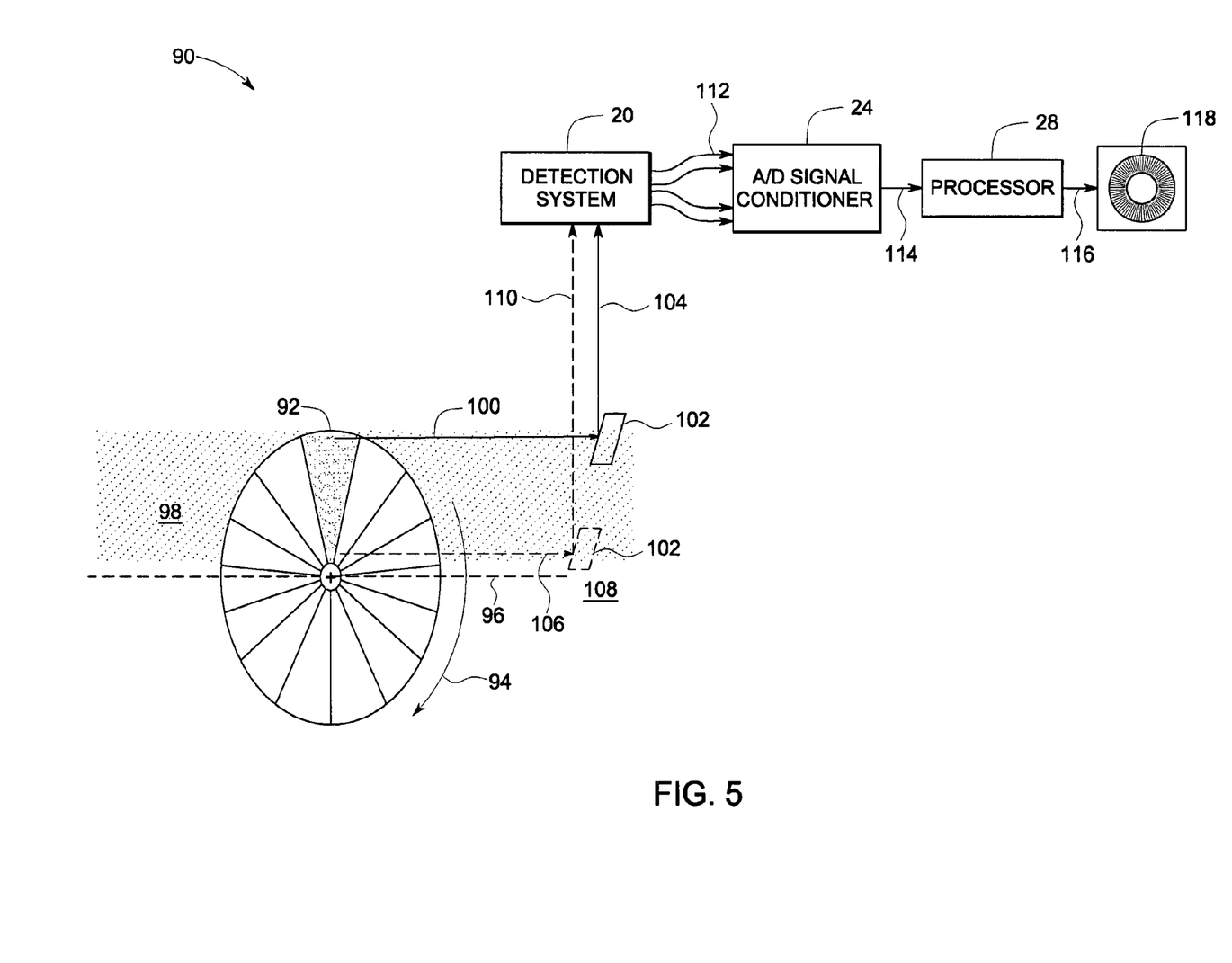
FIG. 5 is a diagrammatic illustration of an exemplary configuration of a multi-wavelength pyrometry system of FIG. 1 for area mapping of a rotating gas turbine blade in determining a temperature profile of the blade in accordance with an embodiment of the invention.

FIG. 5 illustrates a multiwavelength pyrometry system 90 configured to detect a two dimensional temperature map of a rotating object using the detection system 20 of FIG. 1. In the illustrative example, the rotating object includes gas turbine blades 92. However, the invention is equally applicable to other rotating objects. The two dimensional temperature map of the rotating object is obtained by scanning radially along blades 92 of the rotating object. Each of the blades 92 rotates in a direction 94 into the page along an axis 96 in a flow of hot gas path 98. Radiation 100 emitted by a tip of the rotating blade 92 passes through an optical and probe system 102. The optical and probe system 102 is configured so as to have an extra degree of freedom of motion to map the blade 92 along the radial direction. In the present embodiment, the optical and probe system 102 includes a sight tube probe with a fixed mirror. Radiation 104 reflected from the optical and probe system 100 is then incident on the detection system 20 of FIG. 1. In order to map a second dimension of the blade 92, the optical and probe system 102 is then traversed radially along the blade 92 in and out of the hot gas path 98. Radiation 106 emitted close to a hub of the blade 92 passes through the optical and probe system at a position 108 as shown by dotted lines. Radiation 110 reflected from the optical and probe system at position 108 again passes through the detection system 20. Analog signals 112 from the detection system 20 pass through an analog to digital signal conditioner 24 as referenced in FIG. 1 that outputs a digitized signal 114. The digitized signal 114 is further processed by a processor 28 as referenced to in FIG. 1 to output a two dimensional temperature map 118 of the rotating object.

Figure 6:
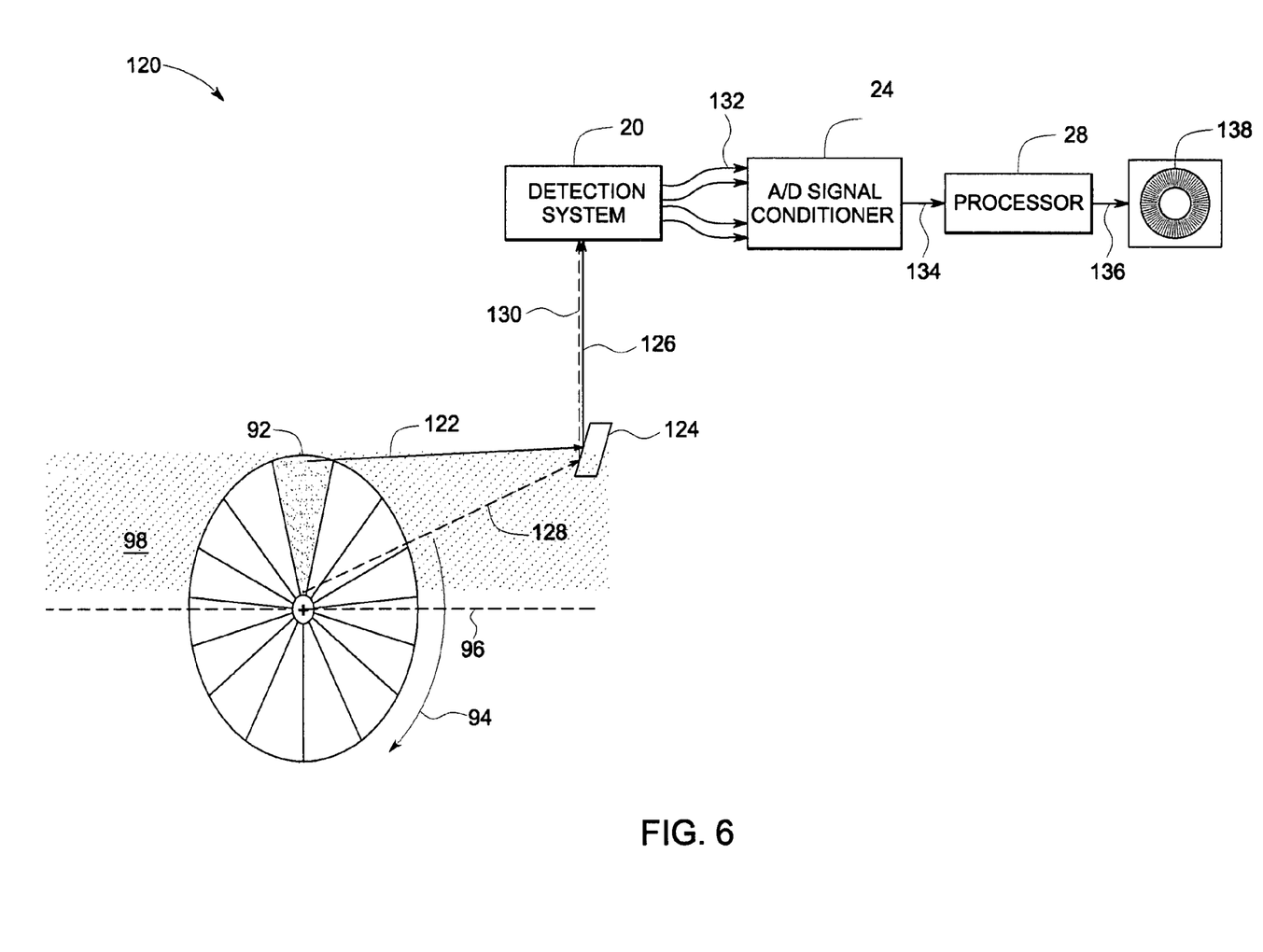
FIG. 6 is a diagrammatic illustration of an exemplary configuration of a multi-wavelength pyrometry system of FIG. 1 for area mapping of a rotating gas turbine blade in determining a temperature profile of the blade in accordance with an embodiment of the invention.

FIG. 6 illustrates another exemplary embodiment of the multiwavelength pyrometry system 120 using the detection system 20 of FIG. 1 to obtain a two dimensional temperature map of a rotating object. In an illustrative example, the rotating object includes a gas turbine blades. However, the invention is equally applicable to other rotating objects. The two dimensional temperature map of the rotating object is obtained by scanning radially along blades 92 of the rotating object. Each of the blades 92 rotates along an axis 94 into the page along an axis 96 in a flow of hot gas path 98. Radiation 122 emitted by a tip of the rotating blade 92 passes through an optical and probe system 124. The optical and probe system 124 is configured so as to have an extra degree of freedom of motion to map the blade 92 along the radial direction of the blade. In the present embodiment, the optical and probe system 124 includes a probe with a pivoting mirror. Radiation 126 reflected from the optical and probe system 124 is then incident on the detection system 20 of FIG. 1. In order to map a second dimension of the blade 92, the pivoting mirror of the optical and probe system 124 is adjusted to an angle so as to obtain radiation 128 from a hub of the blade 92. Radiation 128 emitted close to the hub of the blade 92 passes through the optical and probe system 124 as shown by dotted lines. Radiation 130 reflected from the optical and probe system 124 again passes through the detection system 20. Analog signals 132 from the detection system 20 pass through an analog to digital signal conditioner 24 as referenced to in FIG. 1 that outputs a digitized signal 134. The digitized signal 134 is further processed by a processor 28 as referenced to in FIG. 1 to output a two dimensional temperature map 138 of the rotating object.

Advantageously, the above-described multiwavelength pyrometry systems do not split the incident radiation. Thus, all of the incident radiation is directed at each of the detectors. This provides a lower noise base and facilitates increased data acquisition speed relative to prior systems that use split signals.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A thermal measurement system comprising:
   a plurality of detectors configured to receive radiation within a plurality of wavelength ranges;
   a mirror configured to selectively direct the radiation from a rotating object to each of the detectors;
   an actuator mechanically coupled to the mirror and configured to rotate the mirror through a plurality of angles after respective ones of a plurality of revolutions of the rotating object, such that radiation from the rotating object is collected for one revolution of the rotating object using a respective one of the detectors, and radiation from the rotating object is collected for another revolution of the rotating object using another of the detectors; and
   an optical and probe subsystem disposed between the rotating object and the mirror to focus the radiation on to the mirror.

2. The thermal measurement system of claim 1, wherein the rotating object comprises a gas turbine blade.

3. The thermal measurement system of claim 1, configured to sample radiation at a plurality of spots on the rotating object during a revolution of the rotating object.

4. The thermal measurement system of claim 1, further comprising a processor configured to receive a plurality of signals from the detectors and to determine a two dimensional temperature map of the rotating object.

5. A thermal measurement system comprising:
   a plurality of detectors configured to receive radiation from a rotating object within a plurality of wavelength ranges;
   a rotor configured to rotate about an axis, wherein the detectors are circumferentially arranged on the rotor;
   a motor mechanically coupled to the rotor and configured to rotate the rotor about the axis after respective ones of a plurality of revolutions of the rotating object, such that radiation from the rotating object is collected for one revolution of the rotating object using a respective one of the detectors, and radiation from the rotating object is collected for another revolution of the rotating object using another of the detectors; and an optical and probe subsystem disposed between the rotating object and the rotor and configured to focus radiation from the rotating object onto each of the detectors.

6. The thermal measurement system of claim 5, wherein the detectors are configured to receive radiation within the wavelength range of about 0.6 micrometers and greater.

7. The thermal measurement system of claim 5, wherein the plurality of detectors comprises three or more detectors.

8. The thermal measurement system of claim 5, wherein the detectors are selected from the group consisting of indium-gallium-arsenide based detectors, silicon based detectors, extended indium-gallium-arsenide based detectors and lead-antimony based detectors.

9. The thermal measurement system of claim 5, wherein the optical and probe subsystem comprises a fiber optic cable or an assembly of lenses and mirrors.

10. The thermal measurement system of claim 5, further comprising an analog to digital signal conditioner configured to convert an analog signal from each of the detectors to a digital signal.

11. The thermal measurement system of claim 5, further comprising a processor configured to receive intensity data from each of the detectors, and determine a temperature profile of the object based on the intensity data.

12. The thermal measurement system of claim 5, further comprising a plurality of filters configured to selectively filter the radiation received by the detectors.

13. The thermal measurement system of claim 5, wherein the rotating object comprises a gas turbine blade.

14. The thermal measurement system of claim 5, configured to sample radiation at a plurality of spots on the rotating object during a revolution of the rotating object.

15. The thermal measurement system of claim 5, further comprising a processor configured to receive a plurality of signals from the detectors and to determine a two dimensional temperature map of the rotating object.

* * * * *

UNITED STATES PATENT AND TRADEMARK OFFICE
CERTIFICATE OF CORRECTION

PATENT NO.        : 7,633,066 B2                                    Page 1 of 1
APPLICATION NO. : 11/438604
DATED             : December 15, 2009
INVENTOR(S)       : Antel, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Second Day of November, 2010

David J. Kappos
*Director of the United States Patent and Trademark Office*